United States Patent
Yuan et al.

(10) Patent No.: US 12,289,168 B2
(45) Date of Patent: Apr. 29, 2025

(54) DAI AND CODEBOOK UPDATING FOR DCI SCHEDULING MULTIPLE CCS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/788,669

(22) PCT Filed: Jan. 17, 2020

(86) PCT No.: PCT/CN2020/072657
§ 371 (c)(1),
(2) Date: Jun. 23, 2022

(87) PCT Pub. No.: WO2021/142755
PCT Pub. Date: Jul. 22, 2021

(65) Prior Publication Data
US 2023/0030642 A1 Feb. 2, 2023

(51) Int. Cl.
*H04W 56/00* (2009.01)
*H04L 1/1822* (2023.01)
(Continued)

(52) U.S. Cl.
CPC .......... *H04L 1/1822* (2013.01); *H04L 1/1854* (2013.01); *H04L 1/1896* (2013.01);
(Continued)

(58) Field of Classification Search
CPC ... H04L 1/1822; H04L 1/1854; H04L 1/1896; H04L 5/0048; H04L 5/0055; H04L 5/0092
(Continued)

(56) References Cited

U.S. PATENT DOCUMENTS

| | | |
|---|---|---|
| 10,491,338 B2 | 11/2019 | Baldemair |
| 2018/0102892 A1 | 4/2018 | Lunttila et al. |

(Continued)

FOREIGN PATENT DOCUMENTS

| | | |
|---|---|---|
| CN | 107925523 A | 4/2018 |
| WO | 2011053990 A1 | 5/2011 |

(Continued)

OTHER PUBLICATIONS

"Choi et al., Method, Apparatus And System For Transmitting Or Receiving A Data Channel And A Control Channel In A Wireless Communication System, Dec. 12, 2022, ES 2930416" (Year: 2018).*

(Continued)

*Primary Examiner* — Sai Ming Chan
(74) *Attorney, Agent, or Firm* — Arent Fox Schiff LLP

(57) ABSTRACT

Example implementations include a method, apparatus and computer-readable medium of wireless communication at a user equipment, including receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The implementations further include transmitting a physical uplink control channel (PUCCH) including a position for hybrid automatic repeat request (HARQ)-Acknowledgement (ACK) bits corresponding to the PDSCH for each of the at least two component carriers. Also included is a corresponding a method, apparatus and computer-readable medium of wireless communication at a base station.

29 Claims, 11 Drawing Sheets

(51) Int. Cl.
*H04L 1/1829* (2023.01)
*H04L 1/1867* (2023.01)
*H04L 5/00* (2006.01)

(52) U.S. Cl.
CPC .......... *H04L 5/0048* (2013.01); *H04L 5/0055* (2013.01); *H04L 5/0092* (2013.01)

(58) Field of Classification Search
USPC ........................................................ 370/329
See application file for complete search history.

(56) References Cited

U.S. PATENT DOCUMENTS

| 2019/0342035 | A1 | 11/2019 | Zhang et al. | |
| 2021/0075561 | A1* | 3/2021 | Baldemair | H04L 1/1614 |
| 2023/0006798 | A1* | 1/2023 | Lee | H04L 1/1607 |

FOREIGN PATENT DOCUMENTS

| WO | 2019032019 A1 | 2/2019 |
| WO | 2019098896 A1 | 5/2019 |
| WO | 2019158820 A1 | 8/2019 |

OTHER PUBLICATIONS

"Hwang et al., Method for Transmitting and Receiving Downlink Data Channel and Apparatus Therefor, Oct. 10, 2019, CA 3070553" (Year: 2019).*
China Telecom: "Discussion on Multi-TRP/Panel Transmission Enhancements", 3GPP TSG RAN WG1 #98bis, R1-1911235, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019, XP051808357, pp. 1-9, pp. 2-pp. 6.
Ericsson: "New WID on NR Dynamic Spectrum Sharing (DSS)", 3GPP TSG RAN Meeting #86, RP-193260, 3rd Generation Partnership Project, Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 12, 2019, XP051840390, 4 Pages, Section 4.1, paragraph [04.1].
Huawei, et al., "Enhancements on Multi-TRP/Panel Transmission", 3GPP TSG RAN WG1 Meeting #98, R1-1908066, 3rd Generation Partnership Project, Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, XP051764689, 23 Pages, Section 2.2.2, p. 3.
Supplementary European Search Report—EP20913282—Search Authority—The Hague—Aug. 28, 2023.
International Search Report and Written Opinion—PCT/CN2020/072657—ISA/EPO—Oct. 15, 2020.

* cited by examiner

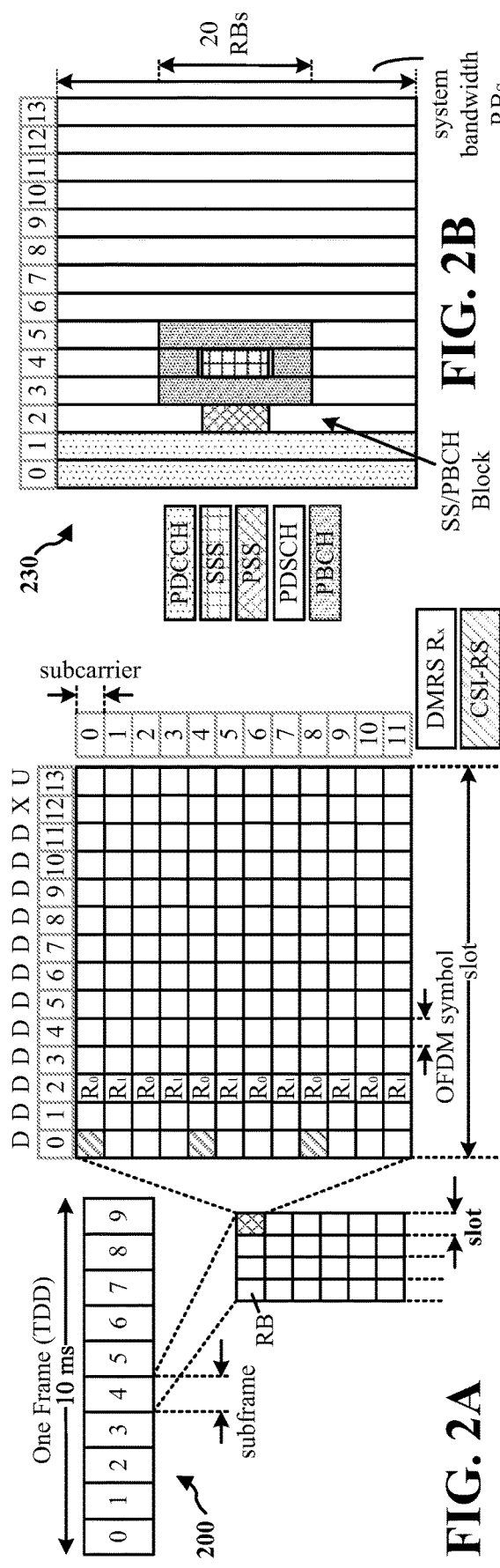
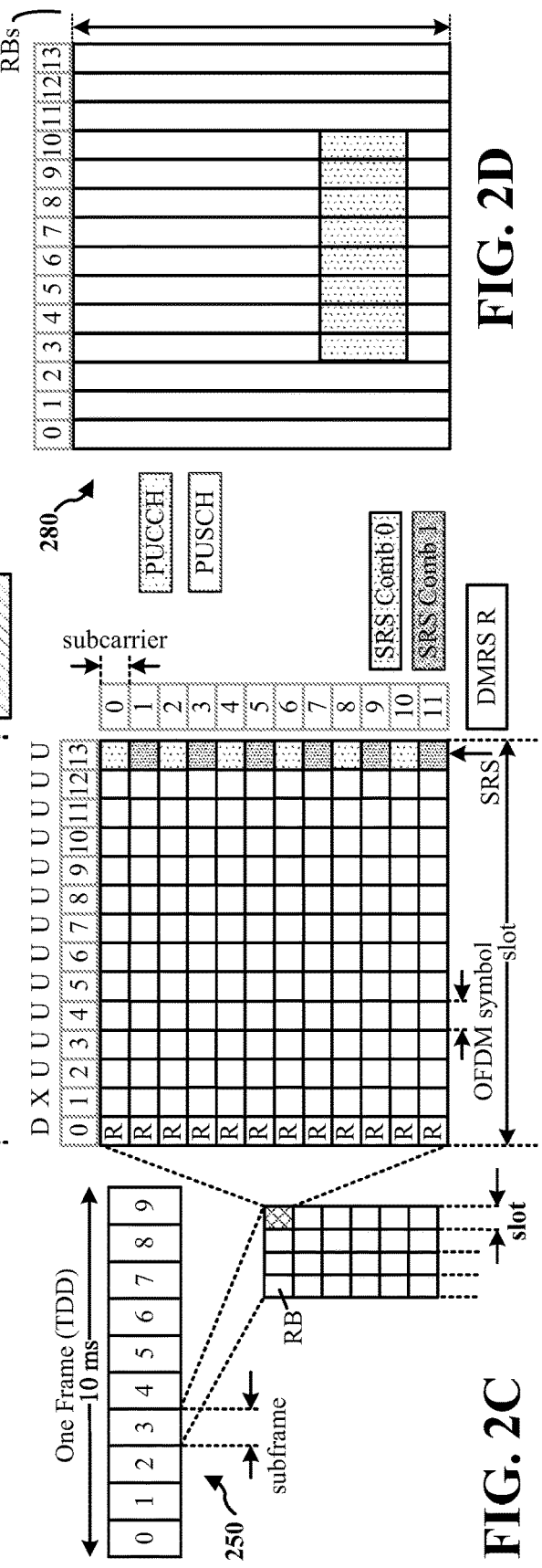
FIG. 2A
FIG. 2B
FIG. 2C
FIG. 2D

Note: PDSCH3 and PDSCH4 may be not received by the UE

DAI AND CODEBOOK UPDATING FOR DCI SCHEDULING MULTIPLE CCS

CROSS-REFERENCE TO RELATED APPLICATIONS

This application is a 35 U.S.C. § 371 National Phase Application of PCT Application No. PCT/CN2020/072657 filed Jan. 17, 2020, entitled "DAI AND CODEBOOK UPDATING FOR DCI SCHEDULING MULTIPLE CCS," which is assigned to the assignee hereof.

BACKGROUND

Technical Field

The present disclosure relates generally to communication systems, and more particularly, to updating a downlink assignment index (DAI) and a corresponding codebook in the case of a downlink control information (DCI) scheduling multiple component carriers (CCs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment, including receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The method further includes transmitting a physical uplink control channel (PUCCH) including a position for hybrid automatic repeat request (HARQ)-Acknowledgement (ACK) bits corresponding to the PDSCH for each of the at least two component carriers.

Another example implementation includes an apparatus at a user equipment for wireless communication, including a processor and a memory in communication with the processor. The memory storing instructions which, when executed by the processor, cause the processor to receive on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The instructions when executed by the processor further cause the processor to transmit a physical uplink control channel (PUCCH) including a position for hybrid automatic repeat request (HARQ)-Acknowledgement (ACK) bits corresponding to the PDSCH for each of the at least two component carriers.

Another example implementation includes an apparatus at a user equipment for wireless communication, including means for receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The apparatus further includes means for transmitting a physical uplink control channel (PUCCH) including a position for hybrid automatic repeat request (HARQ)-Acknowledgement (ACK) bits corresponding to the PDSCH for each of the at least two component carriers.

Another example implementation includes a computer-readable medium storing instructions for wireless communication, at a user equipment, executable by a processor to receive on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The instructions are further executable to transmit a physical uplink control channel (PUCCH) including a position for hybrid automatic repeat request (HARQ)-Acknowledgement (ACK) bits corresponding to the PDSCH for each of the at least two component carriers.

An example implementation includes a method of wireless communication at a base station, including transmitting on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The method further includes receiving a physical uplink control channel (PUCCH) including a position for hybrid automatic repeat request (HARQ)-Acknowledgement (ACK) bits corresponding to the PDSCH for each of the at least two component carriers.

Another example implementation includes an apparatus at a base station for wireless communication, including a processor and a memory in communication with the processor. The memory storing instructions which, when executed by the processor, cause the processor to transmit on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The instructions when executed by the processor further cause the processor to receive a physical uplink control channel (PUCCH) including a position for hybrid automatic repeat request (HARQ)-Acknowledgement (ACK) bits corresponding to the PDSCH for each of the at least two component carriers.

Another example implementation includes an apparatus at a base station for wireless communication, including means for transmitting on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The apparatus further includes means for receiving a physical uplink control channel (PUCCH) including a position for hybrid automatic repeat request (HARQ)-Acknowledgement (ACK) bits corresponding to the PDSCH for each of the at least two component carriers.

Another example implementation includes a computer-readable medium storing instructions for wireless communication, at a base station, executable by a processor to transmit on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. The instructions are further executable to receive a physical uplink control channel (PUCCH) including a position for hybrid automatic repeat request (HARQ)-Acknowledgement (ACK) bits corresponding to the PDSCH for each of the at least two component carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, used by the base station and/or UE of FIG. 1.

DETAILED DESCRIPTION

Figure 1:
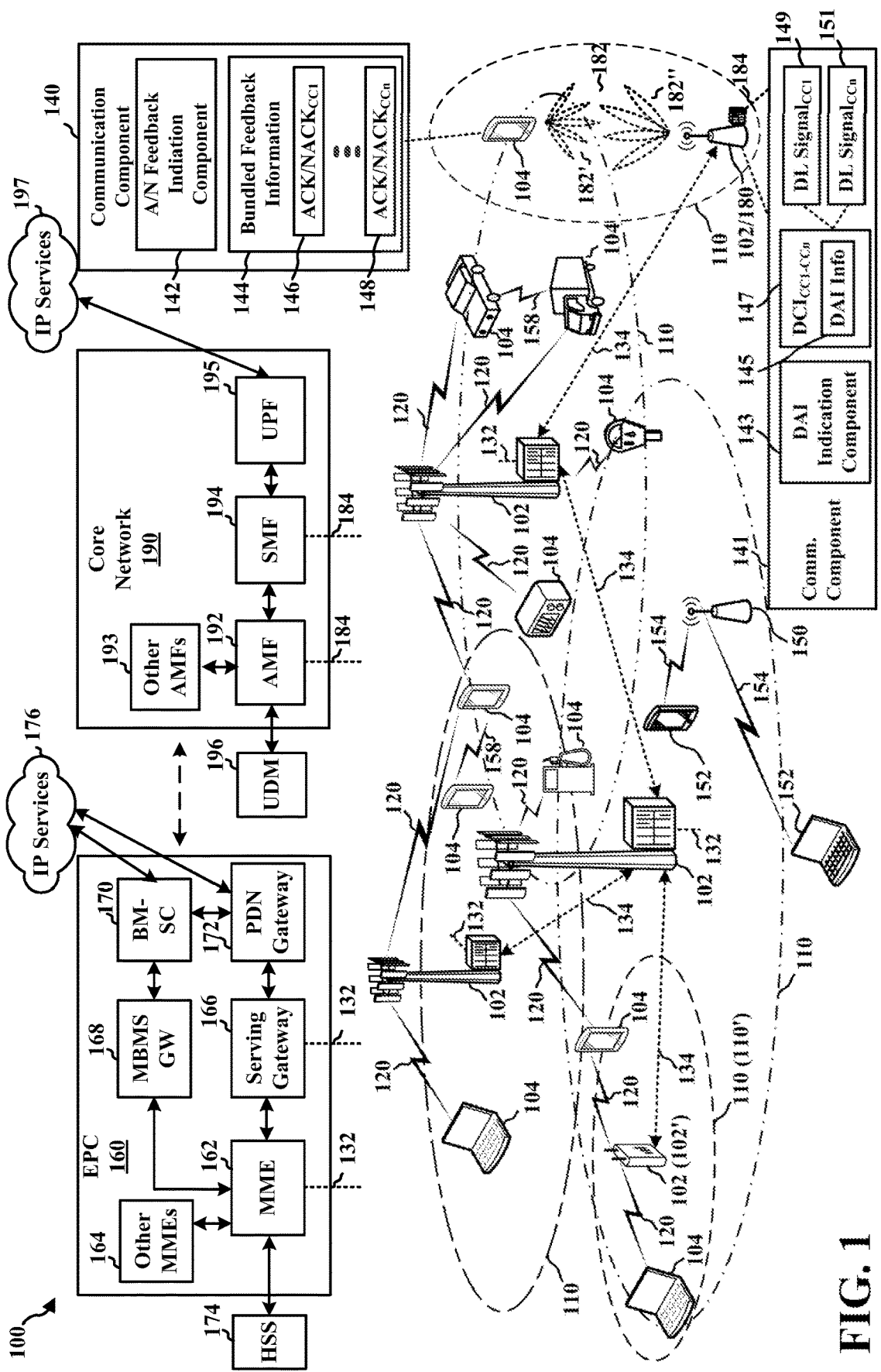
FIG. 1 is a diagram of an example of a wireless communications system and an access network including a base station and a UE configured for updating a downlink assignment index (DAI) and a corresponding codebook in the case of a downlink control information (DCI) scheduling multiple component carriers (CCs).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure relates to updating a downlink assignment index (DAI) and a corresponding codebook in the case of a downlink control information (DCI) scheduling multiple component carriers (CCs), which may also be referred to herein as cells. The techniques described herein enable a base station and UE to accurately identify control signaling messages and/or data messages and their receipt status, particularly in the case of cross-carrier scheduling. As such, the present solutions may improve efficiency in cross-carrier scheduling scenarios, e.g., carrier aggregation, as well as in dynamic spectrum sharing scenarios.

In an implementation, for example, the disclosed methods, apparatus, and computer-readable media are directed to updating a downlink assignment index (DAI) communicated to a UE for reporting feedback on downlink signaling in a case where a single downlink control information (DCI) transmitted on the control channels of multiple component carriers schedules transmissions on each of the multiple component carriers. The DAI may be used to track a number of scheduled transmissions to be acknowledged based on a hybrid automatic repeat request (HARQ) codebook. According to the present aspects, in a DCI that schedules a physical downlink shared channel (PDSCH) on multiple component carriers, the DCI may be updated based on the number of component carriers. More particularly, the base station transmitting the DCI may update the DAI based on one or any combination of an index of a scheduled component carrier, a DAI counter value, and/or a monitoring occasion. Correspondingly, the feedback information from the UE, e.g., the HARQ codebook for a physical uplink control channel (PUCCH) transmission may also be updated and/or formatted based on the number of component carriers on which the DCI is received. More specifically, for instance, when transmitting bundled feedback information, the UE may updated the HARQ codebook such that each component carrier per detected DCI is counted as one position for a HARQ acknowledgement bit of the scheduled PDSCH in the PUCCH transmission. In an implementation, the UE may format the HARQ acknowledgement positions to be first sorted/ordered based on ascending order of scheduled component carrier index in the same PDCCH monitoring occasion, then based on ascending order of PDCCH monitoring occasion index.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system (also referred to as a wireless wide area network (WWAN)) defines an access network 100 including base stations 102, UEs 104, an Evolved Packet Core (EPC) 160, and another core network 190 (e.g., a 5G Core (5GC)).

According to the present aspects, the base station 102 and the UE 104 may have established communications on multiple component carriers (CC), and the base station 102 may schedule the UE 104 on multiple CCs using a single DC. Specifically, the base station 102 includes a communication component 141 in communication with the UE 104 and having a downlink assignment index (DAI) indication component 143 configured to generate DAI information 145 for transmission with a single downlink control information (DCI) 147 that schedules resources for monitoring by the UE 104 on a plurality of CCs. For example, the plurality of CCs may be up to n CCs, where n is a positive integer, and where such DCI is indicated by the notation $DCI_{CC1\text{-}CCn}$. For instance, the DCI 147 may perform cross-carrier scheduling by indicating resources to the UE 104 for a first downlink (DL) signal on a first CC, e.g., DL $signal_{CC1}$ 149, and up to an nth DL signal on an nth CC, e.g., up to DL $signal_{CCn}$ 151. Further, for instance, the DAI information 145 may be used to identify specific feedback, e.g., feedback 146 up to feedback 148, with respect to each of the scheduled DL signals on each of the multiple CCs within a set of bundled feedback information 144, such as a HARQ codebook. The feedback may include, for example, an acknowledgement (ACK) or a negative acknowledgement (NACK) of each respective DL signal.

Correspondingly, the UE 104 may include a communication component 140 in communication with the base station 104 and having an ACK/NACK feedback indication component 142 configured to generate the bundled feedback information 144 based on the DAI information 145 from the DCI 147 and in response to receipt of the plurality of DL signals, e.g., DL signal$_{CC1}$ 149 up to DL signal$_{CCn}$ 151, on the multiple CCs.

As such, implementation of the present solution a base station and UE to accurately identify control signaling messages and/or data messages and their receipt status, particularly in the case of cross-carrier scheduling. As such, the present solutions may improve efficiency in cross-carrier scheduling scenarios, e.g., carrier aggregation, as well as in dynamic spectrum sharing scenarios. Further details of the present solution are described in detail in the subsequent figures.

The base stations 102 may include macrocells (e.g., a relatively higher power cellular base station) and/or small cells (e.g., relatively lower power cellular base station). The macrocells include base stations. The small cells include femtocells, picocells, and microcells. Some of the base stations 102 may be configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). Some of the base stations 102 may be configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present description may be focused on 5G NR, the concepts described herein may be applicable to other similar areas, such as LTE, LTE-A, CDMA, GSM, and other wireless technologies.

Referring to FIGS. 2A-2D, the base station 102 and UE 104 described herein may utilize one or more examples 200, 230, 250, and/or 280 of frame structures, resources, and communication channels for exchanging communications as described herein. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The sub-carrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

Referring to FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

Referring to FIG. 2B, diagram 230 includes an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

Referring to FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

Referring to FIG. 2D, diagram 280 includes an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
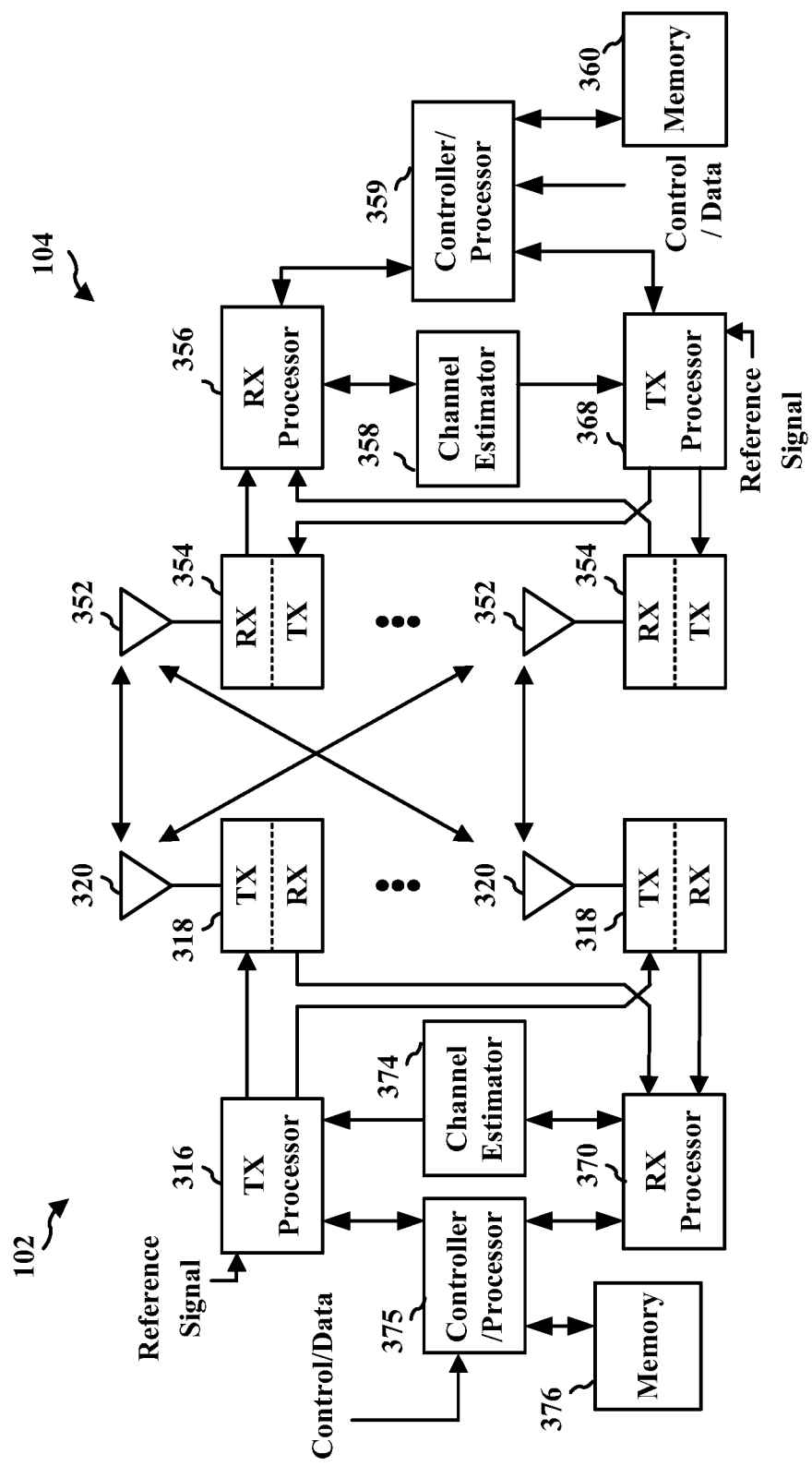
FIG. 3 is a block diagram an example of components of the base station and the UE of FIG. 1.

Referring to FIG. 3, the base station 102 in communication with the UE 104 in the access network 100 may include a variety of hardware components for performing the communications described herein. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 140 (FIG. 1) as described herein.

At least one of the TX processor 316, the RX processor 370, and the controller/processor 375 may be configured to perform aspects in connection with communication component 141 (FIG. 1) as described herein.

Figure 4:
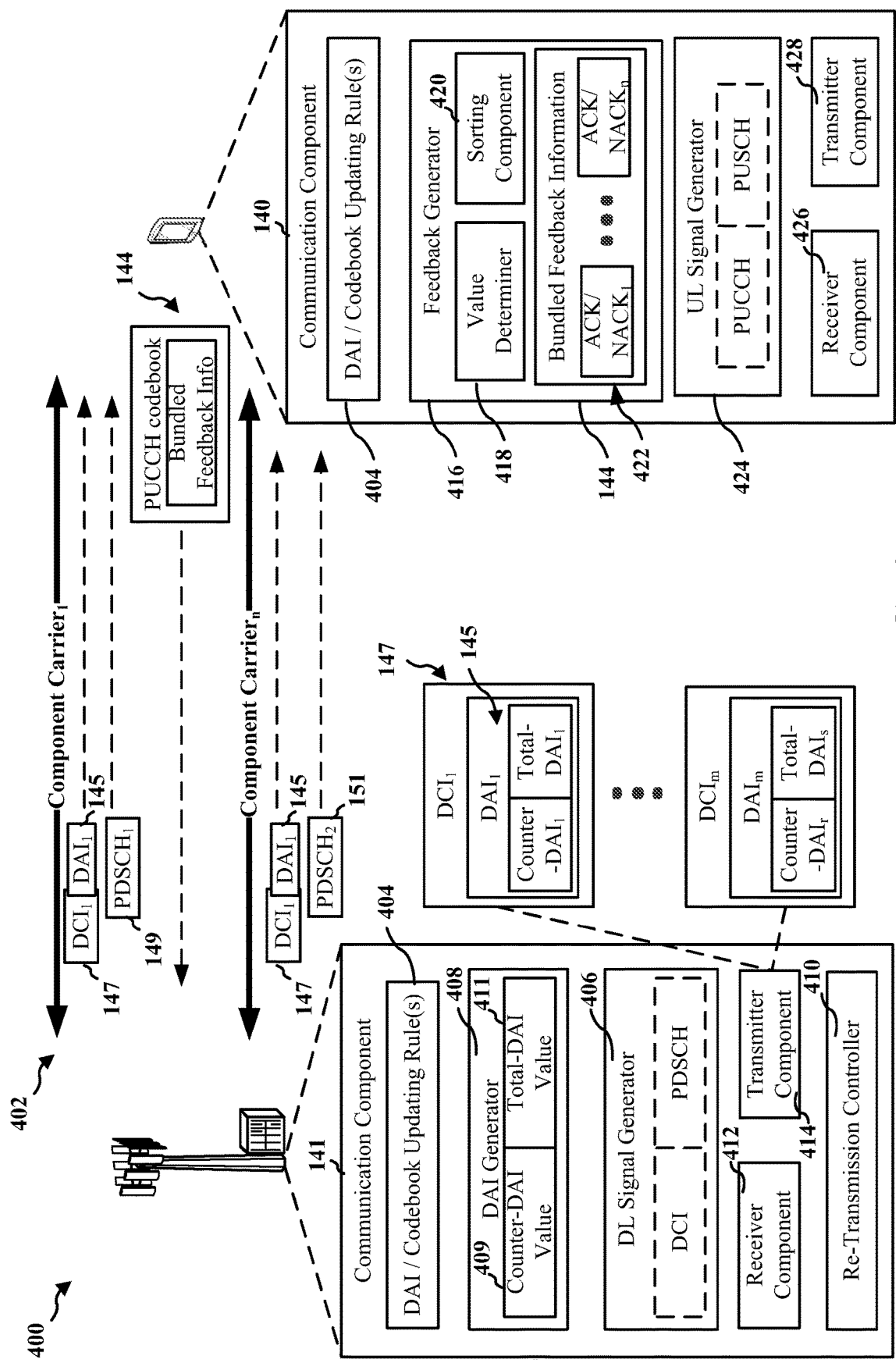
FIG. 4 is a schematic diagram of a cross-carrier scheduling scenario wherein the base station transmits a single DCI to schedule multiple component carriers used in communication with the UE.
Figure 5:
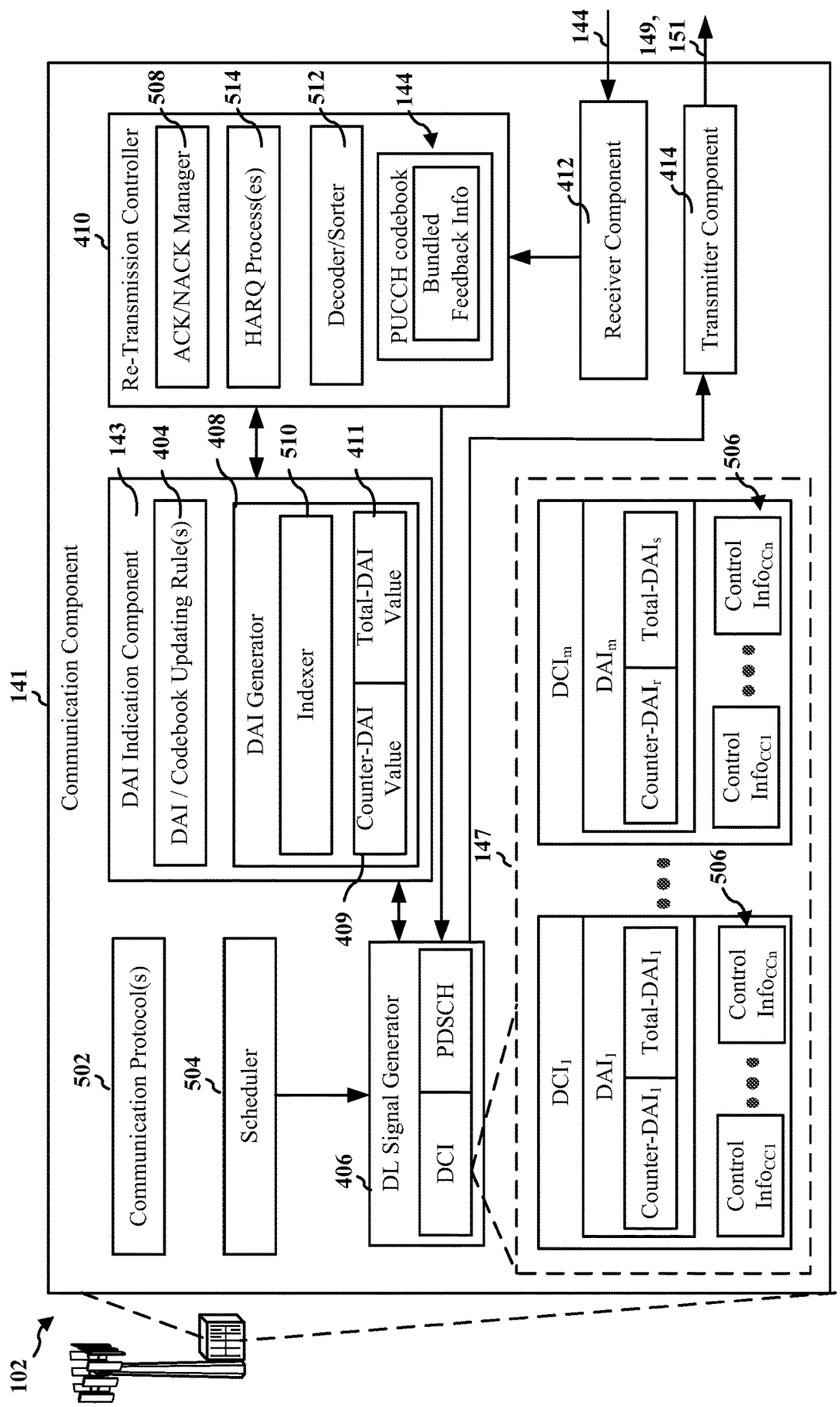
FIG. 5 is a block diagram of a more detailed set of components of the base station operating in the cross-carrier scheduling scenario of FIG. 4.
Figure 6:
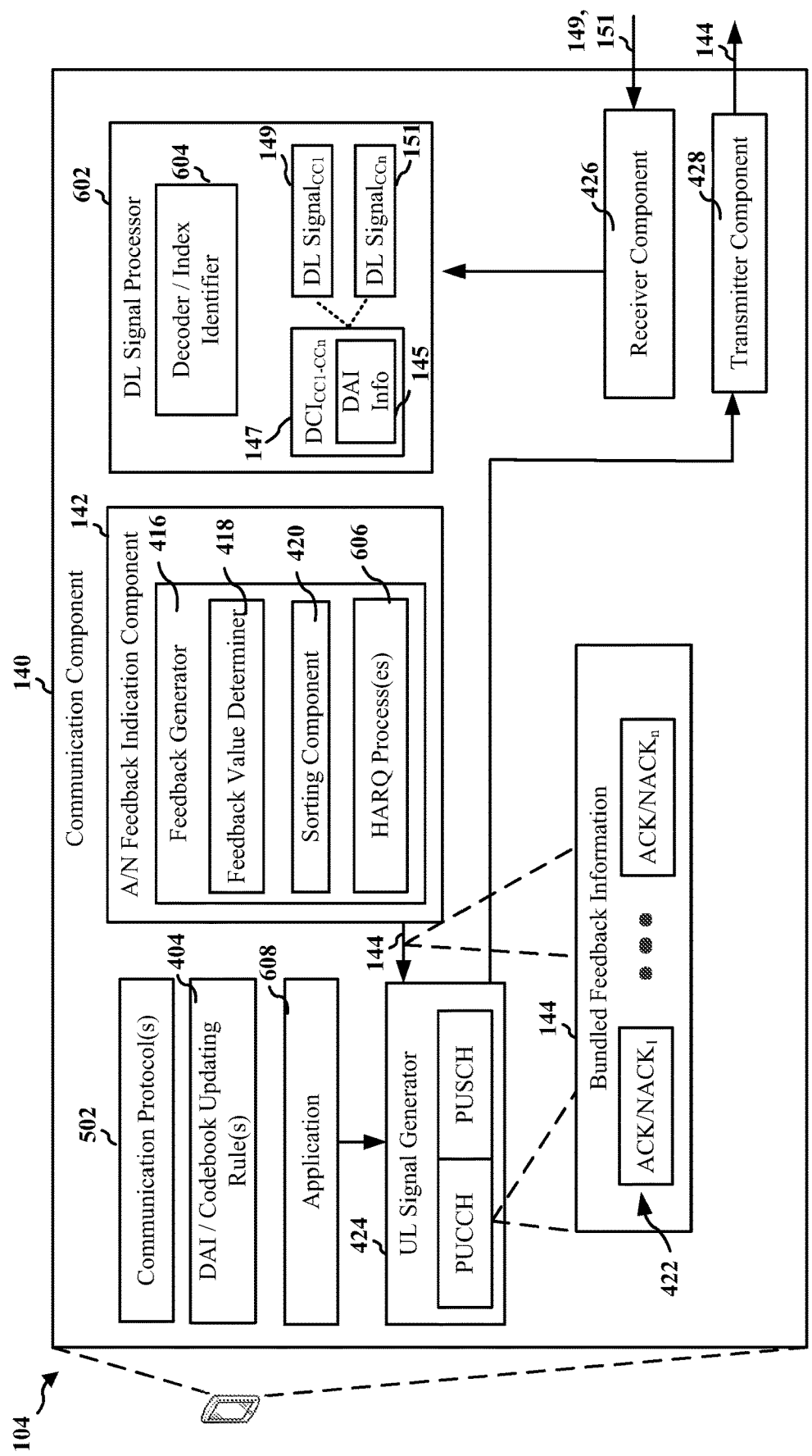
FIG. 6 is a block diagram of a more detailed set of components of the UE operating in the cross-carrier scheduling scenario of FIG. 4.

Referring to FIGS. 4-6, an example cross-carrier scheduling scenario 400 includes the base station 102 and the UE 104 having established communications on multiple component carriers (CCs) 402 and utilizing one or more DAI/codebook updating rules 404 to enable the base station 102 to transmit the single DCI 147 to schedule DL signals 149, 151 for receipt by the UE 104 on each of the multiple CCs 402. Notably, the DCI 147 includes DAI information 145 that is updated according to one or more DAI/codebook updating rules 404 to enable the UE 104 to identify specific feedback relative the status of the receipt of the DL signals 149, 151, e.g., $PDSCH_1$ and $PDSCH_2$, scheduled by the single DCI 147 on each of the multiple CCs 402.

The DAI information 145 includes, but is not limited to, a counter-DAI (C-DAI) value or index and/or a total-DAI counter or index, which may be respective fields in the DAI information 145. The C-DAI value indicates the accumulative number of {serving cell, PDCCH monitoring occasion}-pair(s) in which PDSCH reception(s) or SPS PDSCH release is present, up to the current serving cell and current PDCCH monitoring occasion. The T-DAI value, when present, indicates the total number of {serving cell, PDCCH monitoring occasion}-pair(s) in which PDSCH reception(s) or SPS PDSCH release is present, up to the current PDCCH monitoring occasion and is updated from PDCCH monitoring occasion to the PDCCH monitoring occasion. The C-DAI value and/or T-DAI value may be explicitly signaled, or in some cases one of more of the C-DAI values and/or T-DAI values may be implicitly signaled, as is explained below.

Correspondingly, the cross-carrier scheduling scenario 400 includes the UE 104 transmitting bundled feedback information 144, configured according to one or more DAI/codebook updating rules 404, to the base station 102 in response to receiving the DL signals 149, 151 scheduled by the single DCI 147 on each of the multiple CCs 402. The base station 102 may then re-transmit unsuccessfully received or unsuccessfully decoded ones of the signals 149, 151 based on the indications provided by the bundled feedback information 144.

It should be noted that current DAI and codebook updating rules are not configured to account for a case of a single DCI scheduling PDSCH for multiple CCs. For example, current solutions cannot properly account for the scheduling of multiple CCs by a single DCI, thereby leading to inaccurate feedback or an inability to efficiently perform cross-carrier scheduling and/or dynamic spectrum sharing.

In contrast, the one or more DAI/codebook updating rules 404 are configured to enable this cross-carrier scheduling and/or dynamic spectrum sharing by providing a mechanism for accurate feedback reporting in an simple and efficient manner.

For example, for the base station 102, in a case where the cross-carrier scheduling scenario 400 includes the DCI 147 scheduling multiple DL signals 149, 151, e.g., PDSCHs, on the plurality of CCs 402, the one or more DAI/codebook updating rules 404 may instruct the base station 102 to update the DAI information 145 in the DCI 147 based on the following options:

Option 1: C-DAI and/or T-DAI values signaled in the DCI are increased by one per CC, e.g., n (number of the multiple CCs) in total; or Option 2: C-DAI and/or T-DAI values signaled in the DCI are increased by one.

Alternatively, or in addition, for the UE 104, in the case where the DCI 147 is scheduling multiple DL signals 149, 151, e.g., PDSCH, on the plurality of CCs 402, the one or more DAI/codebook updating rules 404 may instruct the UE 104 to update the bundled feedback information 144, e.g., the HARQ-ACK in the PUCCH codebook, based on the following option:

Option 1: Each scheduled CC per detected DCI is counted by UE as one position for the HARQ-ACK bit(s) of the corresponding scheduled PDSCH in the PUCCH codebook. In this case, the HARQ-ACK positions are first sorted based on ascending order of scheduled CC index (e.g., CC1 then CC2 and so on) in the same PDCCH monitoring occasion, then based on ascending order of PDCCH monitoring occasion index.

More specifically, continuing to refer to FIGS. 4-6, in scenario 400, the multiple component carriers (CCs) 402 may be any plurality of CCs, e.g., up to n where n is a positive integer. To establish the multiple CCs 402, the base station 102 and UE 104 may operate their respective communication components 141, 140, according to one or more communication protocols 502 that may instantiate, for example, one or more protocols stacks on each of the base station 102 and the UE 104 configured to initiate or define one or more of the components described herein and/or perform the functionality described herein, and to communicate with each other over a wireless and/or wired network.

Further, the base station 104 and/or the communication component 141 may execute a DL signal generator 406 configured to generate one or more single DCIS 147 that each schedule a respective set of the multiple CCs 402. For example, each single DCI 147 may include a plurality of control information 506 (e.g., in FIG. 5, Control Info cci up to Control Info$_{CC_n}$, wherein n is a positive integer), where the control information identifies the scheduled resources, e.g., one or more time/frequency resource blocks, for the UE 104 to monitor to receive a DL signal. The single DCI 147 may be triggered, for example, by a scheduler component 504 that receives data packets for delivery to the UE 104 and/or that generates control signaling identify, for example, reserved UL or DL resources, to configure the UE 104. For instance, the DL signal generator 406 may additionally be configured to generate the DL signals 149, 151, such as one or more PDSCHs, to convey the data packets the UE 104. Alternatively, or in addition, the generation of the single DCI 147 may be triggered by other events, such as but not limited to new radio resource configurations, and/or retransmission of DL signals such as may be indicated by re-transmission controller 410. For instance, the re-transmission controller 410 may include an ACK/NACK manager component 508 that keeps track of the status of receipt of DL signals, as is explained below.

Also, the base station 104 and/or the communication component 141 may execute a DAI generator 408, associated with the DAI indication component 143, configured to generate the DAI information 145 to be included in each single DCI 147 that schedules multiple CCs 402. In an implementation, the DAI generator 408 is configured to operate an indexer component 510 to update the C-DAI value 409 and/or the T-DAI value 411 according to the one or more DAI/codebook updating rules 404, and provide such values to the DL signal generator 406 for including in the corresponding single DCI 147.

Further, the base station 102 and/or the communication component 141 and/or the re-transmission controller 410 may execute a decoder/sorter component 512 on the received bundled feedback information 144 or PUCCH codebook to parse the data and identify the specific feedback indications. For instance, re-transmission controller 410 is configured to receive an UL signal including the bundled feedback information 144 or PUCCH codebook, such as on a PUCCH, and decode the bundled feedback information 144 based on the one or more DAI/codebook updating rules 404 in order to interpret HARQ ACKS/NACKS for specific DL signals, and thereby determine whether or not to call for a re-transmission of a DL signal. For instance, re-transmission controller 410 may execute the decoder/sorter component 512 to decode and parse the bundled feedback information 144 to identify the specific feedback values. The ACK/NACK manager component 508 may then keep track of the status of receipt of UL signals, for instance, using one or more HARQ processes 514, which based on HARQ processing rules may be configured to generate a request for a re-transmission of a DL signal. Alternatively, the information in the received UL signal(s) may be further processed by the communication component 141 and/or the base station 102, for example, to clear a DL queue, or inform the scheduler component 504.

Moreover, the base station 102 and/or the communication component 141 may execute a receiver component 412 to receive the communications described herein, and a transmitter component 414 to transmit the communications described herein. In an implementation, the receiver component 412 and the transmitter component 414 may be interfaces to/from the communications component 141 and/ or they may be associated with a transmitter or receiver, respectively, or a transceiver.

Additionally, as noted above, the communication component 141 of the base station 102 as described herein may be implemented by at least one of the TX processor 316, the RX processor 370, and the controller/processor 375 of FIG. 3.

Correspondingly, the UE 104 operates the communication component 140 in communication with the base station 104, executing the ACK/NACK feedback indication component 142 according to the one or more DAI/codebook updating rules 404, to generate the bundled feedback information 144 based on the DAI information 145 from the DCI 147 and in response to receipt of the plurality of DL signals, e.g., DL signal$_{CC1}$ 149 up to DL signal$_{CC_n}$ 151, on the multiple CCs 402. The feedback may include, for example, an acknowledgement (ACK) or a negative acknowledgement (NACK) of each respective DL signal.

For example, in an implementation, the UE 104 and/or the communication component 140 and/or the ACK/NACK feedback indication component 142 may execute a DL signal processor 602 to receive and process the DCI 147 and the multiple DL signals 149, 151. Further, the DL signal processor 602 may execute a decoder/index identifier component 604 to attempt to parse the corresponding DAI information 145 from the DCI 147 and attempt to decode the received DL signals 149, 151 and track a successful or unsuccessful decoding result based on the DAI information 145 and the one or more DAI/codebook updating rules 404. The DL signal processor 602 may then communicate with a feedback generator component 416, and in particular with one or more HARQ processes 606, to track the status of the received DL signals 149, 151. The feedback generator 416 operates a feedback value determiner 418 in combination with a sorting component 420 to utilize the results of the processing by the DL signal processor 602 and HARQ processes 606, in combination with the one or more DAI/codebook updating rules 404, to determine an order and/or position of the specific feedback values 422 indicated in the bundled feedback information 144. For example, each specific feedback value 422 may be indicated by a bit or bits, where one value indicates successful receipt and decoding, e.g., an ACK, whereas a different value indicates unsuccessful receipt and/or decoding, e.g., a NACK. For example, this particular formatting and/or positioning of the feedback enables the base station 102 to accurately identify and correlate the specific feedback contained in the bundled feedback information 144 for each of the plurality of transmitted DL signals 149, 151 scheduled by the single DCI 147 on each of the multiple CCs 402.

Further, in an implementation, the UE 104 and/or communication component 140 includes an UL signal generator 424 configured to generate one or more UL signals, including the bundled feedback information 144 as generated by the feedback generator 416. The UL signal generator 424 may also generate other UL control and/or data signals, such as a PUSCH to carry data generated by the UE 104 for transmission to the base station 102 or another device directly or indirectly in communication with the UE 102 over a wired or wireless network. For instance, the UL signal generator 424 may receive data packets from one or more applications 608 executing on the UE 104.

Moreover, the UE 104 and/or the communication component 140 may execute a receiver component 426 to receive the communications described herein, and a transmitter component 428 to transmit the communications described herein. In an implementation, the receiver component 426 and the transmitter component 428 may be interfaces to/from the communications component 140 and/or they may be associated with a transmitter or receiver, respectively, or a transceiver.

Moreover, as noted above, the communication component 140 of the UE 104 as described herein may be implemented by at least one of the TX processor 368, the RX processor 356, and the controller/processor 359 of FIG. 3.

Figures 7A, 7B, 7C:
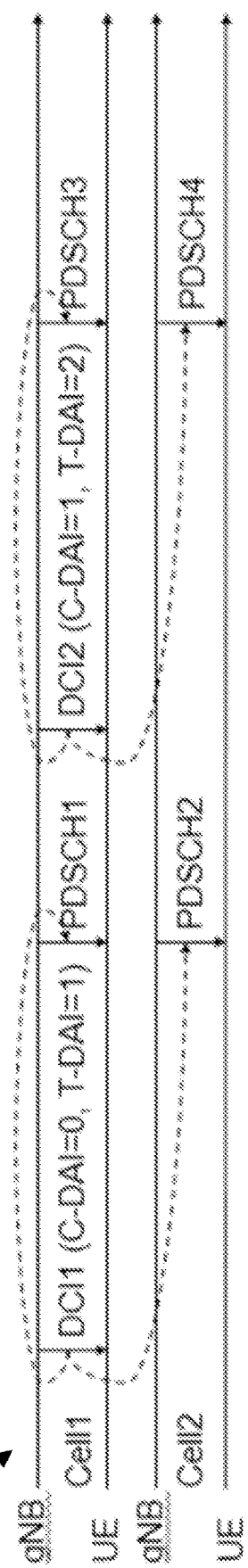
FIGS. 7A to 7C are diagrams of different examples of signaling over time between the base station and the UE configured for updating DAI and the corresponding codebook in the case of the DCI scheduling multiple CCs.

Referring to FIGS. 7A-C, examples of signaling scenarios 700, 730, and 750, respectively, represent cases where different variations in the DAI/codebook updating rules 404 are used, and all include updating at least one of the counter DAI or the total DAI in the DCI by a value that is incremented by at least 1 or by a number of the multiple component carriers scheduled by a previous DCI. In these examples, the base station 102 is indicated as gNB and the multiple component carriers are indicated as Cell 1 and Cell 2.

For example, in scenario 700, both of the counter DAI and the total DAI in the DCI have respective values that are incremented by a number of the at least two component carriers from a previous DCI. For instance, since DCI1 is the first DCI and it schedules both the first component carrier (CC1, or, Cell 1 as illustrated), the counter DAI is initially set with a value of 0 and the total DAI value is set to include the number of scheduled PDSCHs, e.g., 2 in this case. The subsequent DCI2 therefore increments the counter DAI by 2 based on the number of PDSCHs previously scheduled, and the total DAI value is incremented add the number of previously scheduled PDSCHs, e.g., $PDSCH_1$ and $PDSCH_2$, to the number of currently scheduled PDSCHs, e.g., PDSCH3 and PDSCH4, and thus is incremented from 2 to 4 in this case.

In the variation of scenario 730, the counter DAI in each subsequent DCI is incremented by 1, whereas the total DAI is incremented by the number of component carriers scheduled by the previous DCI.

Further, for example, in scenario 750, both the counter DAI and the total DAI are incremented by at least 1 from a previous DCI. Specifically, in this variation, the total DAI is initially set at a value of 1 since the incrementing is only by 1 and not by the number of component carriers scheduled.

Figure 8A:
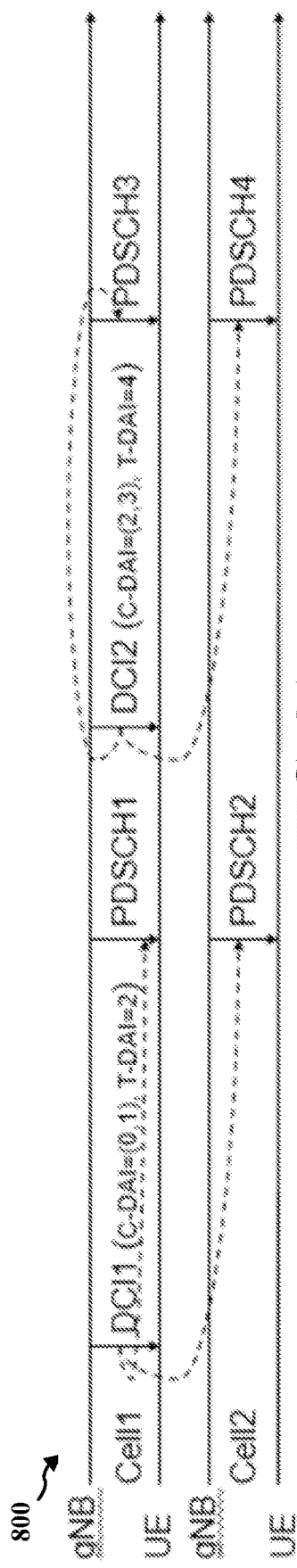
FIG. 8A to 8C are diagrams of additional, different examples of signaling over time between the base station and the UE configured for updating DAI and the corresponding codebook in the case of the DCI scheduling multiple CCs.
Figure 8B:
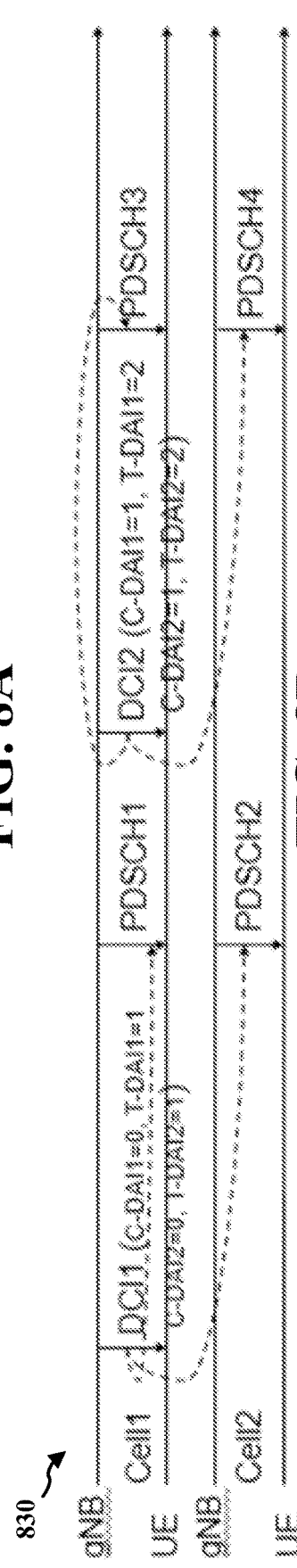
Figure 8C:
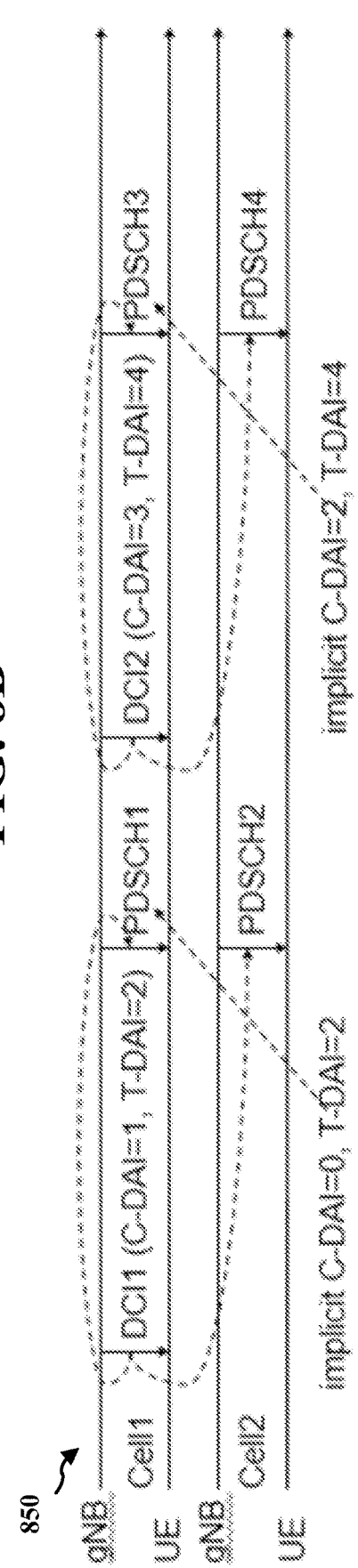

Referring to FIGS. 8A-C, examples of signaling scenarios 800, 830, and 850, respectively, represent cases where different variations in the DAI/codebook updating rules 404 are used, and all include using multiple values for one or both of the counter DAI and the total DAI, as well as updating at least one of the multiple values of the counter DAI or the total DAI in the DCI by a value that is incremented by at least 1 or by a number of the multiple component carriers scheduled by a previous DCI. In these examples, the base station 102 is indicated as gNB and the multiple component carriers are indicated as Cell 1 and Cell 2.

In scenario 800, the counter DAI includes a value for each of the at least two component carriers and the total DAI is incremented by a number of the at least two component carriers from a previous DCI. For example, for DC1, the counter DAI is initially set as (0,1) to correspond to scheduled PDSCH1 and PDSCH2, and the total DAI is set to 2 to correspond to the total number of PDSCHs scheduled. Subsequent DCI2 has the counter DAI incremented to (2,3) to correspond to scheduled PDSCH3 and PDSCH4, respectively, and the total DAI is set to 4 to correspond to the total number of PDSCHs scheduled.

In the variation of scenario 830, the DAI includes paired counter DAI and total DAI values for each of the multiple component carriers scheduled, where each counter DAI includes a value for each of the multiple component carriers and the total DAI includes a value for each of the multiple component carriers, wherein the paired counter DAI and total DAI values for a corresponding component carrier are each incremented by 1 when a subsequent DCI schedules a subsequent PDSCH for the corresponding component carrier.

Further, in scenario 850, the counter DAI includes a value for a single component carrier of the multiple component carriers selected by a rule, and the total DAI is incremented by a number of the multiple component carriers scheduled, where the counter DAI value for one or more remaining ones of the multiple component carriers is implicitly indicated or determined based on the rule and the number of the multiple component carriers. For instance, in this example, the rule dictates that the component carrier having the highest index, e.g., component carrier 2 (or Cell 2) in this case, receives the explicit DAI information. Based on this information and the number of component carriers scheduled, the UE 104 can determine the DAI information for the remaining component carriers, e.g., component carrier 1 (or Cell 1) in this case, by further applying the portion of the rule that dictates that the counter DAI and the total DAI are each incremented by a number of the multiple component carriers scheduled.

Figure 9A:
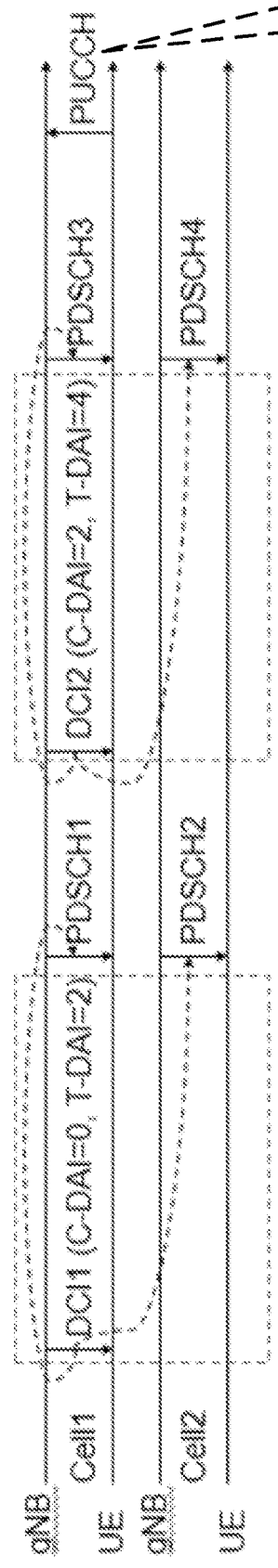
FIG. 9A to 9B are diagrams of additional, different examples of signaling over time between the base station and the UE configured for updating DAI and the corresponding codebook in the case of the DCI scheduling multiple CCs.
Figure 9B:
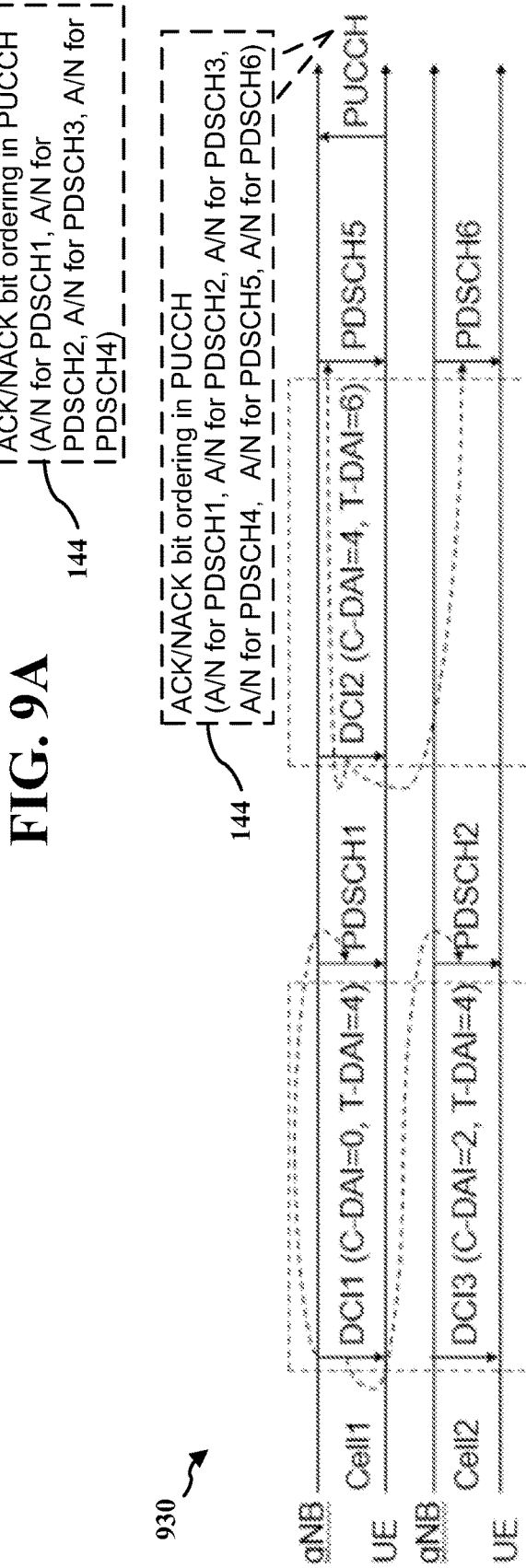

Referring to FIGS. 9A-B, examples of signaling scenarios 900 and 930, respectively, represent cases where different variations in the DAI/codebook updating rules 404 are used, and each include multiple PDCCH monitoring occasions in which one or more DCIS may be transmitted by the base station 104 and received by the UE 104. Correspondingly, these scenarios include updating at least one of the counter DAI or the total DAI in the DCI by a value that is incremented by a number of the multiple component carriers scheduled by a previous DCI. Further, these scenarios include transmitting the bundled feedback information 144 in the form of a physical uplink control channel (PUCCH) including a position for hybrid automatic repeat request (HARQ)-Acknowledgement (ACK) bits corresponding to the PDSCH for each of the multiple component carriers. In these examples, the base station 102 is indicated as gNB and the multiple component carriers are indicated as Cell 1 and Cell 2.

In scenario 900, a single DCI is received in each monitoring occasion, and the feedback is ordered based on the component carrier index per monitoring occasion. In other words, the UE 104 generates and transmits the PUCCH by sorting the HARQ-ACK bits corresponding to the PDSCH for each of the multiple component carriers first in ascending order of scheduled component carrier index within each PDCCH monitoring occasion, then in ascending order of PDCCH monitoring occasion index.

In scenario 930, two DCIs are received in a first monitoring occasion, and a single DCI is received in a second monitoring occasion, but two of the scheduled PDSCHs are not received by the UE 104. Specifically, PDSCH3 and PDSCH4 scheduled by DCI3 are not received by the UE 104. In this case, to generate the bundled feedback information 144 or PUCCH codeword, the UE 104 sorts the HARQ-ACK bits corresponding to the PDSCHs for each of the multiple component carriers in ascending order of scheduled component carrier index, including sorting the HARQ-ACK bits in ascending order of a corresponding counter DAI value.

Figure 10:
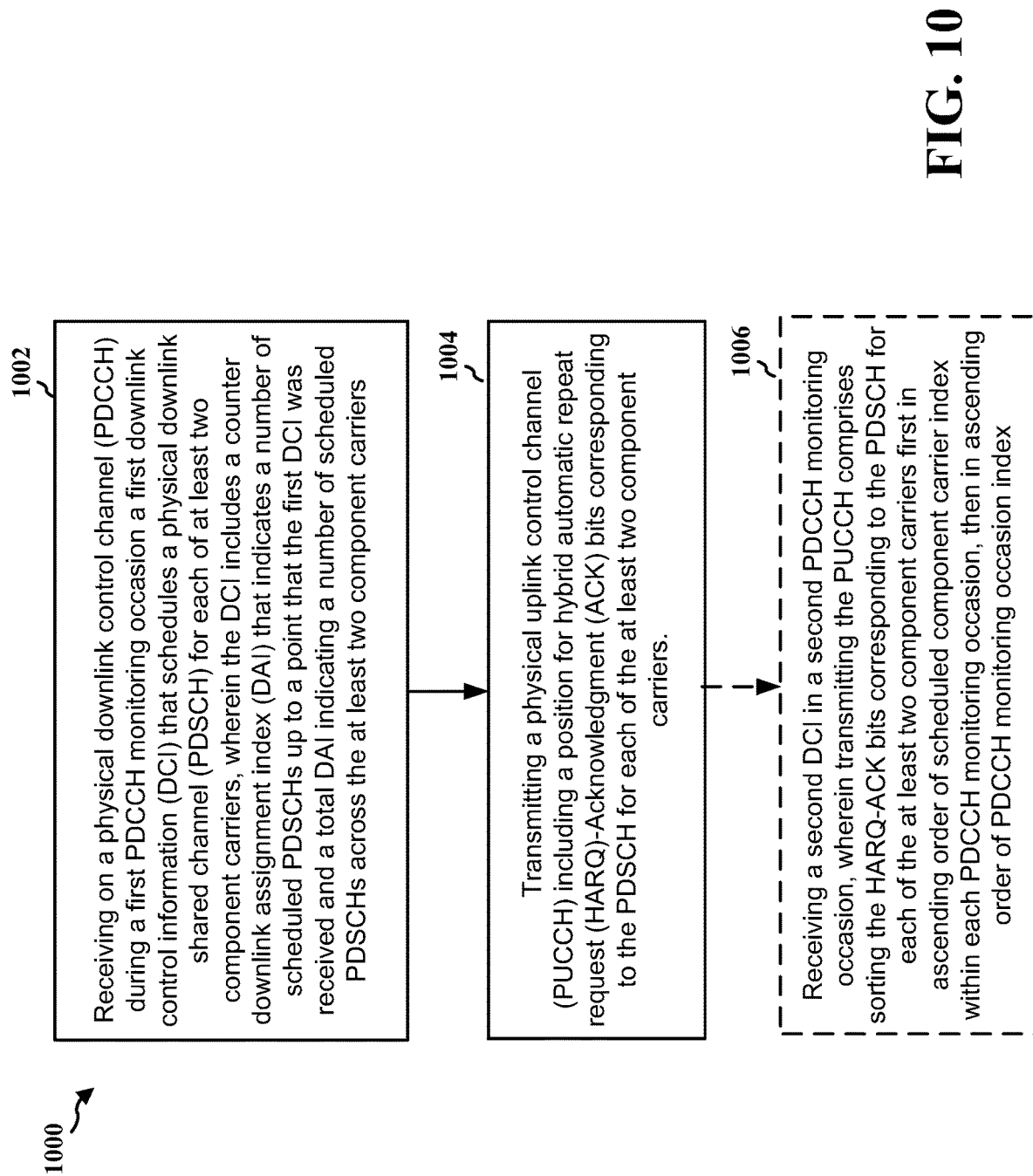
FIG. 10 is a flowchart of an example of a method of wireless communication at a user equipment relating to a single DCI scheduling multiple CCs.

Referring to FIG. 10, an example of a method 1000 of wireless communication performed by the UE 104 may be used in a scenario where a single DCI schedules multiple component carriers. The UE 104 may perform method 800 by executing communication component 140 or one or more subcomponents thereof, and/or via execution of at least one of the TX processor 368, the RX processor 356, and/or the controller/processor 359, as discussed above. Specifics of the actions or features of each portion of the method 1000 are described above in detail.

At 1002, the method 1000 includes receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. Alternatively, or more specifically, the C-DAI value indicates the accumulative number of {serving cell, PDCCH monitoring occasion}-pair(s) in which PDSCH reception(s) or SPS PDSCH release is present, up to the current serving cell and current PDCCH monitoring occasion. The T-DAI value, when present, indicates the total number of {serving cell, PDCCH monitoring occasion}-pair(s) in which PDSCH reception(s) or SPS PDSCH release is present, up to the current PDCCH monitoring occasion and is updated from PDCCH monitoring occasion to the PDCCH monitoring occasion.

Alternatively or in addition, in some implementations, at least one of the counter DAI or the total DAI in the DCI has a value that is incremented by a number of the at least two component carriers from a previous DCI.

Alternatively or in addition, in some implementations, both of counter DAI and the total DAI in the DCI have respective values that are incremented by a number of the at least two component carriers from a previous DCI.

Alternatively or in addition, in some implementations, both the counter DAI and the total DAI are incremented by 1 from a previous DCI.

Alternatively or in addition, in some implementations, the counter DAI includes a value for each of the at least two component carriers and the total DAI is incremented by a number of the at least two component carriers from a previous DCI.

Alternatively or in addition, in some implementations, the counter DAI includes a value for each of the at least two component carriers and the total DAI includes a value for each of the at least two component carriers, wherein a DAI for a means for corresponding component carrier is incremented by 1 when the DCI schedules a PDSCH for the corresponding component carrier.

Alternatively or in addition, in some implementations, the counter DAI includes a value for a single component carrier of the at least two component carriers selected by a rule and the total DAI is incremented by a number of the at least two component carriers, further comprising means for determining a counter DAI value for another of the at least two component carriers based on the rule and the number of the at least two component carriers.

At 1004, the method 1000 includes transmitting a physical uplink control channel (PUCCH) including a position for hybrid automatic repeat request (HARQ)-Acknowledgement (ACK) bits corresponding to the PDSCH for each of the at least two component carriers.

Optionally, at 1006, any of the preceding aspects of the method 1000 may include receiving a second DCI in a second PDCCH monitoring occasion, wherein transmitting the PUCCH comprises sorting the HARQ-ACK bits corresponding to the PDSCH for each of the at least two component carriers first in ascending order of scheduled component carrier index within each PDCCH monitoring occasion, then in ascending order of PDCCH monitoring occasion index.

In this optional case, in some aspects, sorting the HARQ-ACK bits corresponding to the PDSCH for each of the at least two component carriers in ascending order of scheduled component carrier index comprises sorting the HARQ-ACK bits in ascending order of a corresponding counter DAI value.

Figure 11:
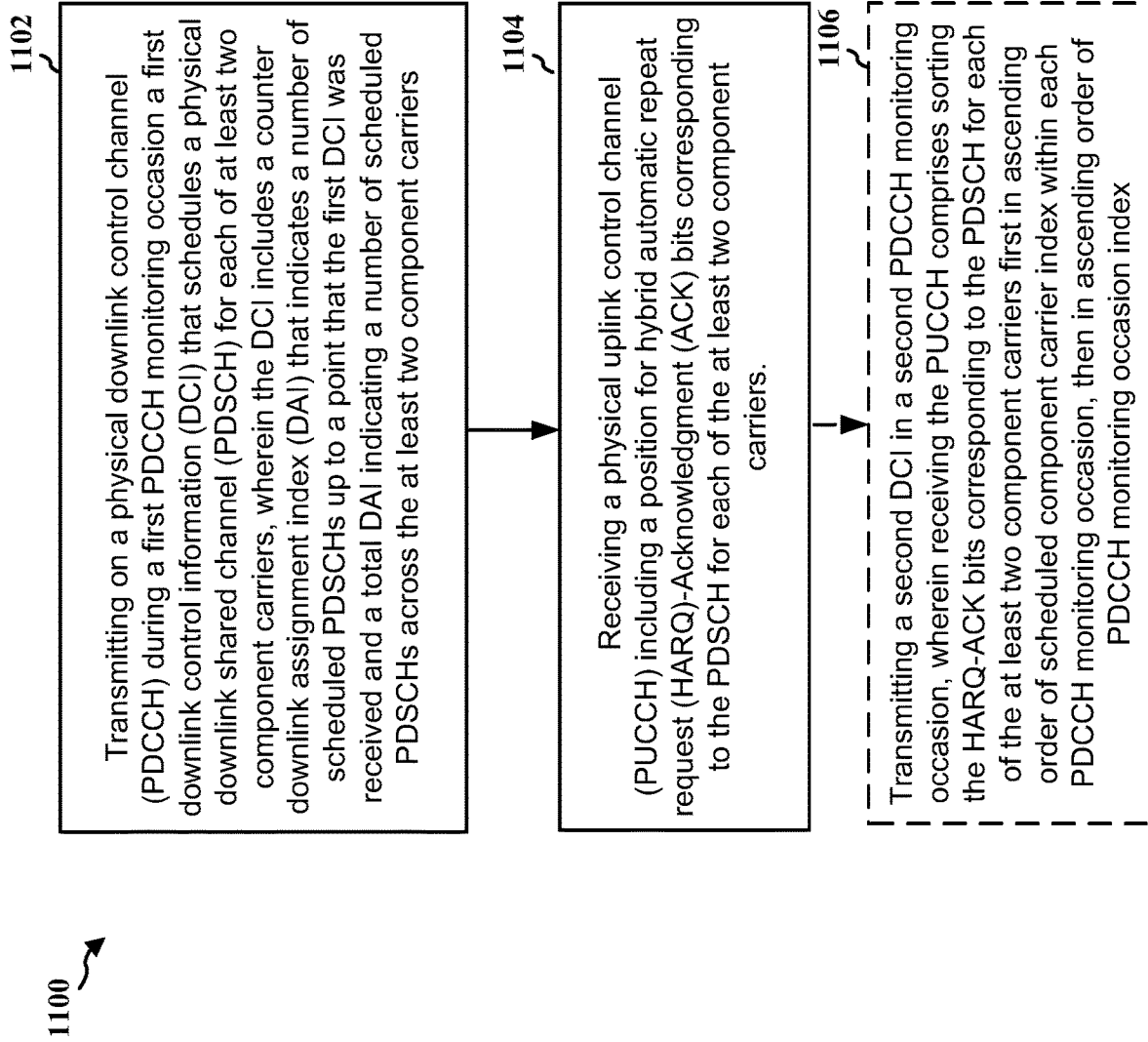
FIG. 11 is a flowchart of an example of a method of wireless communication at a base station relating to a single DCI scheduling multiple CCs.

FIG. 11 is a flowchart 1100 of a method of wireless communication at the base station 102 may be used in a scenario where a single DCI schedules multiple component carriers. The base station 102 may perform the method 1100 by executing communication component 141 or one or more subcomponents thereof, and/or via execution of at least one of the TX processor 316, the RX processor 370, and/or the controller/processor 375, as discussed above. Specifics of the actions or features of each portion of the method 1000 are described above in detail.

At 1102, the method 1100 includes transmitting on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers. Alternatively, or more specifically, the C-DAI value indicates the accumulative number of {serving cell, PDCCH monitoring occasion}-pair(s) in which PDSCH reception(s) or SPS PDSCH release is present, up to the current serving cell and current PDCCH monitoring occasion. The T-DAI value, when present, indicates the total number of {serving cell, PDCCH monitoring occasion}-pair(s) in which PDSCH reception(s) or SPS PDSCH release is present, up to the current PDCCH monitoring occasion and is updated from PDCCH monitoring occasion to the PDCCH monitoring occasion.

At 1104, the method 1100 includes receiving a physical uplink control channel (PUCCH) including a position for hybrid automatic repeat request (HARQ)-Acknowledgement (ACK) bits corresponding to the PDSCH for each of the at least two component carriers.

Alternatively or in addition, in some implementations, at least one of the counter DAI or the total DAI in the DCI has a value that is incremented by a number of the at least two component carriers from a previous DCI.

Alternatively or in addition, in some implementations, both of counter DAI and the total DAI in the DCI have respective values that are incremented by a number of the at least two component carriers from a previous DCI.

Alternatively or in addition, in some implementations, both the counter DAI and the total DAI are incremented by 1 from a previous DCI.

Alternatively or in addition, in some implementations, the counter DAI includes a value for each of the at least two component carriers and the total DAI is incremented by a number of the at least two component carriers from a previous DCI.

Alternatively or in addition, in some implementations, the counter DAI includes a value for each of the at least two component carriers and the total DAI includes a value for each of the at least two component carriers, wherein a DAI for a means for corresponding component carrier is incremented by 1 when the DCI schedules a PDSCH for the corresponding component carrier.

Alternatively or in addition, in some implementations, the counter DAI includes a value for a single component carrier of the at least two component carriers selected by a rule and the total DAI is incremented by a number of the at least two component carriers, further comprising means for determining a counter DAI value for another of the at least two component carriers based on the rule and the number of the at least two component carriers.

Optionally, at 1106, any of the preceding aspects of the method 1100 may include transmitting a second DCI in a second PDCCH monitoring occasion, wherein receiving the PUCCH comprises sorting the HARQ-ACK bits corresponding to the PDSCH for each of the at least two component carriers first in ascending order of scheduled component carrier index within each PDCCH monitoring occasion, then in ascending order of PDCCH monitoring occasion index.

In this case, sorting the HARQ-ACK bits corresponding to the PDSCH for each of the at least two component carriers in ascending order of scheduled component carrier index comprises sorting the HARQ-ACK bits in ascending order of a corresponding counter DAI value.

The UE 104 and/or the base station 102 may include additional components that perform each of the blocks of the algorithm in the aforementioned flowcharts. As such, each block in the aforementioned flowcharts may be performed by a component and the UE 104 and/or the base station 102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers; and transmitting a physical uplink control channel (PUCCH) including a position for hybrid automatic repeat request (HARQ)-Acknowledgement (ACK) bits corresponding to the PDSCH for each of the at least two component carriers.

2. The method of claim 1, wherein at least one of the counter DAI or the total DAI in the DCI has a value that is incremented by a number of the at least two component carriers from a previous DCI.

3. The method of claim 1, wherein both of counter DAI and the total DAI in the DCI have respective values that are incremented by a number of the at least two component carriers from a previous DCI.

4. The method of claim 1, wherein both the counter DAI and the total DAI are incremented by 1 from a previous DCI.

5. The method of claim 1, wherein the counter DAI includes a value for each of the at least two component carriers and the total DAI is incremented by a number of the at least two component carriers from a previous DCI.

6. The method of claim 1, wherein the counter DAI includes a value for each of the at least two component carriers and the total DAI includes a value for each of the at least two component carriers, wherein a DAI for a corresponding component carrier is incremented by 1 when the DCI schedules a PDSCH for the corresponding component carrier.

7. The method of claim 1, wherein the counter DAI includes a value for a single component carrier of the at least two component carriers selected by a rule and the total DAI is incremented by a number of the at least two component carriers, further comprising determining a counter DAI value for another of the at least two component carriers based on the rule and the number of the at least two component carriers.

8. The method of claim 1, further comprising receiving a second DCI in a second PDCCH monitoring occasion, wherein transmitting the PUCCH comprises sorting HARQ-ACK bits corresponding to the PDSCH for each of the at least two component carriers first in ascending order of scheduled component carrier index within each PDCCH monitoring occasion, then in ascending order of PDCCH monitoring occasion index.

9. The method of claim 8, wherein sorting the HARQ-ACK bits corresponding to the PDSCH for each of the at least two component carriers in ascending order of scheduled component carrier index comprises sorting the HARQ-ACK bits in ascending order of a corresponding counter DAI value.

10. An apparatus at a user equipment for wireless communication, comprising:
a processor; and
a memory in communication with the processor and storing instructions which, when executed by the processor, cause the processor to:
receive on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers; and transmit a physical uplink control channel (PUCCH) including a position for hybrid automatic repeat request (HARQ)-Acknowledgement (ACK) bits corresponding to the PDSCH for each of the at least two component carriers.

11. The apparatus of claim 10, wherein at least one of the counter DAI or the total DAI in the DCI has a value that is incremented by a number of the at least two component carriers from a previous DCI.

12. The apparatus of claim 10, wherein both of counter DAI and the total DAI in the DCI have respective values that are incremented by a number of the at least two component carriers from a previous DCI.

13. The apparatus of claim 10, wherein both the counter DAI and the total DAI are incremented by 1 from a previous DCI.

14. The apparatus of claim 10, wherein the counter DAI includes a value for each of the at least two component carriers and the total DAI is incremented by a number of the at least two component carriers from a previous DCI.

15. The apparatus of claim 10, wherein the counter DAI includes a value for each of the at least two component carriers and the total DAI includes a value for each of the at least two component carriers, wherein a DAI for a corresponding component carrier is incremented by 1 when the DCI schedules a PDSCH for the corresponding component carrier.

16. The apparatus of claim 10, wherein the counter DAI includes a value for a single component carrier of the at least two component carriers selected by a rule and the total DAI is incremented by a number of the at least two component carriers, wherein the processor is further configured to determine a counter DAI value for another of the at least two component carriers based on the rule and the number of the at least two component carriers.

17. The apparatus of claim 10, wherein the processor is further configured to receive a second DCI in a second PDCCH monitoring occasion, wherein to transmit the PUCCH comprises sorting HARQ-ACK bits corresponding to the PDSCH for each of the at least two component carriers first in ascending order of scheduled component carrier index within each PDCCH monitoring occasion, then in ascending order of PDCCH monitoring occasion index.

18. The apparatus of claim 17, wherein sorting the HARQ-ACK bits corresponding to the PDSCH for each of the at least two component carriers in ascending order of scheduled component carrier index comprises sorting the HARQ-ACK bits in ascending order of a corresponding counter DAI value.

19. An apparatus at a user equipment for wireless communication, comprising:
means for receiving on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers; and
means for transmitting a physical uplink control channel (PUCCH) including a position for hybrid automatic repeat request (HARQ)-Acknowledgement (ACK) bits corresponding to the PDSCH for each of the at least two component carriers.

20. A method of wireless communication at a base station, comprising:
  transmitting on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was transmitted and a total DAI indicating a number of scheduled PDSCHs across the at least two component carriers; and
  receiving a physical uplink control channel (PUCCH) including a position for hybrid automatic repeat request (HARQ)-Acknowledgement (ACK) bits corresponding to the PDSCH for each of the at least two component carriers.

21. The method of claim 20, wherein at least one of the counter DAI or the total DAI in the DCI has a value that is incremented by a number of the at least two component carriers from a previous DCI.

22. The method of claim 20, wherein both of counter DAI and the total DAI in the DCI have respective values that are incremented by a number of the at least two component carriers from a previous DCI.

23. The method of claim 20, wherein both the counter DAI and the total DAI are incremented by 1 from a previous DCI.

24. The method of claim 20, wherein the counter DAI includes a value for each of the at least two component carriers and the total DAI is incremented by a number of the at least two component carriers from a previous DCI.

25. The method of claim 20, wherein the counter DAI includes a value for each of the at least two component carriers and the total DAI includes a value for each of the at least two component carriers, wherein a DAI for a corresponding component carrier is incremented by 1 when the DCI schedules a PDSCH for the corresponding component carrier.

26. The method of claim 20, wherein the counter DAI includes a value for a single component carrier of the at least two component carriers selected by a rule and the total DAI is incremented by a number of the at least two component carriers, further comprising determining a counter DAI value for another of the at least two component carriers based on the rule and the number of the at least two component carriers.

27. The method of claim 20, further comprising transmitting a second DCI in a second PDCCH monitoring occasion, wherein receiving the PUCCH comprises sorting HARQ-ACK bits corresponding to the PDSCH for each of the at least two component carriers first in ascending order of scheduled component carrier index within each PDCCH monitoring occasion, then in ascending order of PDCCH monitoring occasion index.

28. The method of claim 27, wherein sorting the HARQ-ACK bits corresponding to the PDSCH for each of the at least two component carriers in ascending order of scheduled component carrier index comprises sorting the HARQ-ACK bits in ascending order of a corresponding counter DAI value.

29. An apparatus at a base station for wireless communication, comprising:
  a processor; and
  a memory in communication with the processor and storing instructions which, when executed by the processor, cause the processor to:
    transmit on a physical downlink control channel (PDCCH) during a first PDCCH monitoring occasion a first downlink control information (DCI) that schedules a physical downlink shared channel (PDSCH) for each of at least two component carriers, wherein the DCI includes a counter downlink assignment index (DAI) that indicates a number of scheduled PDSCHs up to a point that the first DCI was received and a total DAI indicating a number of scheduled PDSCHs across the at least two component carriers; and
    receive a physical uplink control channel (PUCCH) including a position for hybrid automatic repeat request (HARQ)-Acknowledgement (ACK) bits corresponding to the PDSCH for each of the at least two component carriers.

* * * * *